March 15, 1932.     K. M. McLAUGHLIN     1,849,499
CONDENSER
Filed Sept. 29, 1930

Inventor
Kenneth M. McLaughlin,
By Cornelius D. Ehret
his Attorney.

Patented Mar. 15, 1932

1,849,499

UNITED STATES PATENT OFFICE

KENNETH M. McLAUGHLIN, OF PHILADELPHIA, PENNSYLVANIA, ASSIGNOR TO ATWATER KENT MANUFACTURING COMPANY, OF PHILADELPHIA, PENNSYLVANIA, A CORPORATION OF PENNSYLVANIA

CONDENSER

Application filed September 29, 1930. Serial No. 484,968.

My invention relates to variable condensers of the type comprising interleaving rotor and stator plates, utilizable for tuning the radio-frequency circuits of radio receiving apparatus.

Particularly in compact radio receivers in which the loud-speaker is located near other components of the receiving apparatus, sound disturbances often result which are generically termed microphonic noises. I have found that the plates of the tuning condensers may be set into vibration, as by the sound vibrations of the loud speaker, resulting in variation of the resonant frequency of the receiver and modulation of incoming radio-frequency energy at audio frequency corresponding to the period of the vibrating plates. After the radio-frequency is rectified by the detector of the receiver, the vibration of the rotor plates is reproduced in the loud speaker as sound vibrations which impings upon and maintain the plates in vibration, the noise building up in amplitude by what may be termed sound regeneration.

In accordance with my invention, modulation of radio-frequency energy by vibrations of the condenser rotor plates is prevented by providing the rotor with a damping arrangement, which specifically, comprises a leaf-spring secured to and extending from the rotor hub and an absorbing member, of felt or equivalent, pressed against the free ends of the rotor plates by the leaf spring.

My invention also resides in features of construction, combination, and arrangement hereinafter described and claimed.

For illustration of a structure embodying my invention, reference is to be had to the accompanying drawings, in which.

Figure 1:
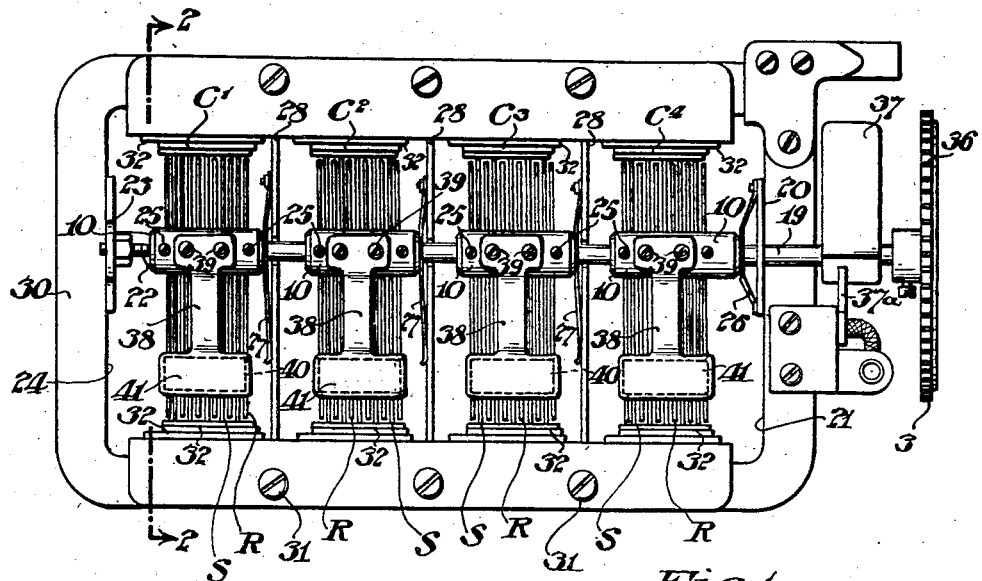
Fig. 1 is a plan view of a multiple or gang condenser having several rotors mounted upon a common shaft.
Figure 2:
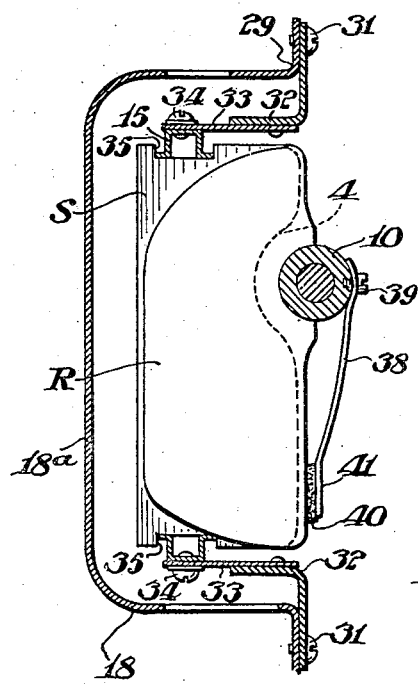
Fig. 2 is an elevational view with parts in section taken on line 2—2 of Fig. 1.

Referring to Figs. 1 and 2, the stator plates S of sheet aluminum or other material are each substantially oblong or rectangular, having a recess 4 for accommodating the hub or sleeve 10 to which is secured a plurality of rotor plates R which are substantially equal in length and width to the stator plates. The rotor plates R may also be stamped from sheet aluminum or other suitable material. The axis of rotation of the rotor plates is offset towards one end of the rotor and stator plates; i. e., as viewed in Fig. 2 the plates extend downwardly to greater extent than they do upwardly or in opposite direction.

The sheet metal housing or cradle 18 is utilized particularly when a plurality of condenser units C1, C2, C3 and C4 are assembled in a gang, their rotor assemblies mounted upon the same shaft 19 which extends through a bearing in the plate 20 secured to the end 21 of the housing 18. At its other end the shaft has a conical recess engaging the complementary end of the bearing screw 22 held by the plate 23 secured to the other end 24 of housing 18. Each of the sleeves 10, carrying a group of rotor plates adapted to interleave with the stator plates of the corresponding condenser, is held in suitable position on shaft 29 by set screws 25. The shaft is thrust to the left, Fig. 1, against the conical bearing screw 22 by a leaf spring 26 having a forked end embracing the shaft and thrusting against the adjacent hub or sleeve 10. Similar springs 27 secured to the shield plates 28, which are suitably fastened to the bottom 18a of the housing 18 and electrostatically isolate the stators of adjacent condensers, may also be utilized.

The housing 18 is provided with upwardly turned side flanges 29 and end flanges 30. Secured by screws 31 to the flanges 29 are the pairs of brackets 32 having secured to their portions within the housing 18 the strips 33 of insulating material to which are secured by screws 34 or equivalent the brackets 15 holding the stator plates S by engaging in their notches 35.

At the right end of the shaft, Fig. 1, is secured a gear segment 3 which may be rotated by any suitable means for adjusting all the condenser rotors in unison for simultaneously tuning a plurality of circuits traversed by radio frequency energy. These circuits may be utilized to couple cascaded vacuum tubes, or they may be directly coupled to each other, as in advance of a radio frequency amplifier or the first detector of a superheterodyne receiver, or one of them may be for tuning the oscillator of a superheterodyne and the others for tuning a signal-selective system. To the member 3 may be attached a dial 36 cooperating with an indicator or pointer, not shown. Secured upon the shaft 19 is a counterweight 37 to balance the rotor structures which may be left at any tuning position to which adjusted without tendency to move therefrom. Upon the flange 30 may be secured the upstanding stop 37a against which the counterweight is adapted to engage to limit the rotor movements.

In radio receiving systems in which the loud speaker is disposed adjacent the remainder of the apparatus, for example by disposition within the same cabinet, there often results a continuous sound, usually of fixed pitch and of such intensity as to mask or materially interfere with the signal, speech or music, sought to be received. Many sources of these sound disturbances have been isolated. I have found that particularly with condensers of the type described, in which the rotor plates extend to substantial extent from the rotor shaft or hub, that the rotor plates, when set into vibration from any cause, vary the resonant frequency of the associated circuits and modulate any radio frequency energy at an audible rate. When this energy is rectified as by the detector of a receiving system, the audio frequency component introduced by the variations of the rotor plates appears as sound vibrations in the output of the loud speaker. Moreover, these sound vibrations reinforce the movements of the rotor plates, resulting in louder reproduction of the disturbance introduced by the vibration, the reaction repeating to build up the intensity of a disturbance by what may be termed "sound regeneration". This reaction takes place even though there is no audio frequency coupling between the circuits tuned by the condensers, as there is practically always radio frequency energy capable of being modulated by the vibrations. During the reception of signals, there is practically always an incoming carrier-wave, and even when a set is not tuned to receive any signal, atmospheric disturbances supply energy capable of being modulated and serve as carrier.

This sound regeneration may be eliminated by damping the condenser plates to prevent them from being vibrated by sound from the loud speaker. For the condenser construction above described, and which is more particularly described and claimed in co-pending Kent application, Serial No. 458,185, filed May 31, 1930, I prefer the damping system shown which comprises a leaf spring 38 secured at one end, as by screws 39, to the hub 10 of the rotor assembly, with a piece of felt 40 or equivalent damping material interposed between the free end 41 of the spring which preferably is substantially equal to the overall width of the rotor assembly and the edges of the rotor plates at or adjacent their free ends. The spring 38 is under tension firmly to press the strip 40 which may be suitably held thereto, as by adhesive, against the edges of the rotor plates, prohibiting any tendency of any or all of the plates to vibrate freely. In the event that the plates are temporarily set into movement by an unusually severe shock, any resulting vibrations are nevertheless so highly damped that no continuous noise resulting from sound regeneration will appear in the output of the loud speaker, as the sound vibrations are not capable of maintaining the plate vibrations.

The construction shown has the mechanical advantage that if the rotor plates are moved or forced beyond their position of maximum capacity, the edges of the stator plates are engaged only by the soft or yielding felt strip 40, and suffer no damage. The recess 4 of the stator plates is of sufficient depth to clear the heads of the screws 39, and neither the stator nor rotor construction need be modified in any way to accommodate attachment of the damping spring and its appurtenances.

For gang condensers I prefer to attach a separate spring to each of the rotor hubs or equivalent with a separate piece of felt to bridge or overlie the edges of the rotor plates of the corresponding rotor assembly. However, it will be understood that other arrangements may be utilized without departing from the spirit and substance of my invention as expressed in the appended claims.

What I claim is:

1. A variable condenser having rotor and stator plates, and a damping system for preventing vibrations of said rotor plates comprising a mass of damping material and a tensioned member for forcing said material into engagement with the edges of said plates.

2. A variable condenser having a rotor and a stator, each comprising a plurality of plates, and a damping system for preventing vibrations of said rotor plates comprising a leaf spring secured to said rotor adjacent the axis of rotation thereof and extending to overlie the edges of said rotor plates, and a strip of damping material firmly held by said spring against the edges of said plates.

3. A variable condenser comprising a rotatable member, plates secured to said member and extending therefrom, a leaf spring secured to said member and extending therefrom in the same direction as said plates, and a strip of damping material interposed between the free ends of said spring and said plates.

4. A variable condenser comprising a rotatable member, plates secured to said member and projecting therefrom to greater extent in one direction than in an opposite direction, a leaf spring secured to said member and extending therefrom in said one direction, and a strip of damping material interposed between the free ends of said spring and said plates.

5. A gang tuning condenser for radio receiving apparatus comprising a rotor assembly including a rotatable shaft and a plurality of groups of plates attached to and movable with said shaft, a plurality of leaf springs each secured to said assembly adjacent the axis of rotation of said shaft, and overlying one of said groups of plates, and clamping material pressed by each of said springs against the edges of the plates of the corresponding group.

KENNETH M. McLAUGHLIN.